(No Model.)

A. B. CAMERON.
METHOD OF MAKING ORNAMENTAL OPEN WORK PANELS.

No. 419,636. Patented Jan. 21, 1890.

WITNESSES:
Gustave Dieterich
William Goebel

INVENTOR
Allan B. Cameron
BY Larb Benjamin
his ATTORNEY

UNITED STATES PATENT OFFICE.

ALLAN B. CAMERON, OF WILLIAMSPORT, PENNSYLVANIA.

METHOD OF MAKING ORNAMENTAL OPEN-WORK PANELS.

SPECIFICATION forming part of Letters Patent No. 419,636, dated January 21, 1890.

Application filed November 12, 1889. Serial No. 330,039. (No model.)

*To all whom it may concern:*

Be it known that I, ALLAN B. CAMERON, of Williamsport, Lycoming county, Pennsylvania, have invented a new and useful Improvement in the Method of Making Ornamental Open-Work Panels, of which the following is a specification.

My invention relates to a panel, preferably of wood, having numerous openings through it of regular form, and so presenting a pleasing and uniform pattern; and it more particularly consists in a cheap and simple method of manufacture of said panel.

Figure 1:
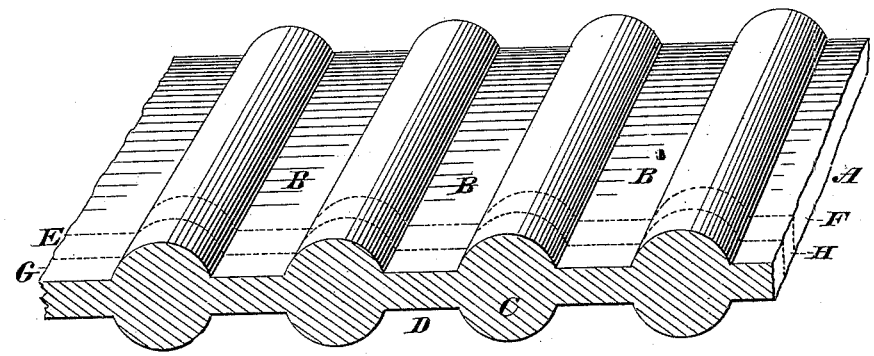
Figure 2:
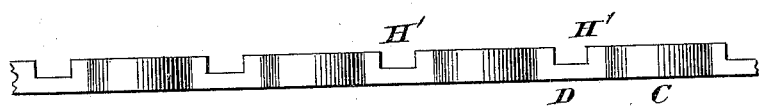
Figure 3:
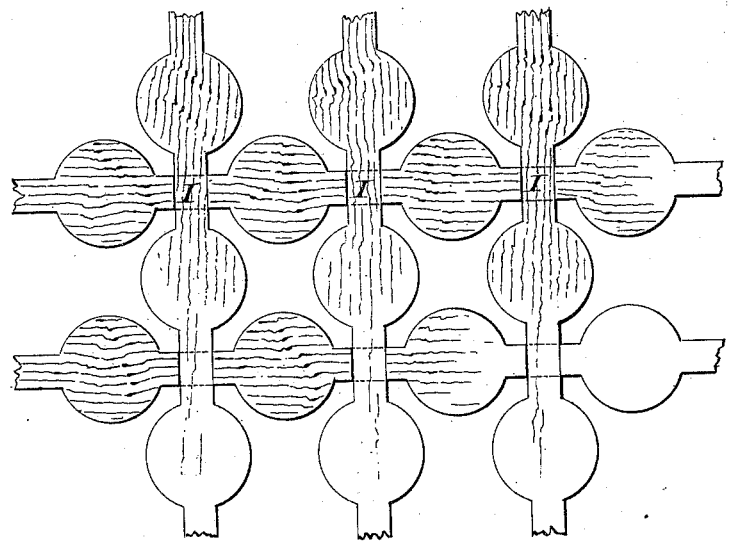

In the accompanying drawings, Figure 1 is a perspective view of a plank or board having transverse grooves or channels formed upon its opposite surfaces, so as to give to said plank a desired longitudinal cross-section. Fig. 2 is an edge view of one of the strips, hereinafter described, longitudinally cut from said board or plank and provided with channels or mortises on one side. Fig. 3 shows several of said strips, as in Fig. 2, united together in order to produce an ornamental pattern.

Similar letters of reference indicate like parts.

I carry my process into practical effect in the following manner: Upon the opposite surfaces of a board or plank A, I produce by cutting a series of parallel grooves B, so as to give the board a longitudinal cross-section of the desired configuration—such, for example, that represented in Fig. 1, which shows a series of circular disks C united by bars D. After the board is thus cut I divide it longitudinally into strips, as indicated by the dotted lines E F G H. Upon one face of each strip and in the flat portions D, I form grooves H'. A number of the strips, as shown in Fig. 2, may then be assembled in any manner so that the grooves in the strips which cross each other meet, or, in other words, so that the several strips become halved together. At the points I, Fig. 3, the material at the points of juncture may be connected by gluing or any other suitable means. It will be seen that in this way a very tasteful and simple ornamental open-work panel is produced, the pattern of which may be varied by grouping the strips in different ways. Of course the thickness of the strips may also be varied at will, so that the thickness of the completed panel may be very small or increased, so as to render said panel practically a stout grating.

I claim as my invention—

The method of producing an ornamental open-work panel, substantially as herein set forth, which consists, first, in producing on opposite sides of a board or plank a series of grooves or channels; second, cutting said board or plank longitudinally into strips; third, producing on one face of each strip a series of regularly-disposed channels or grooves, and, fourth, assembling said strips so that certain strips shall stand transverse to others with their respective grooves corresponding and fitting together, substantially as described.

ALLAN B. CAMERON.

Witnesses:
 ADDISON CANDOR,
 GEO. L. SANDERSON.